(12) United States Patent
Lin et al.

(10) Patent No.: US 9,966,829 B2
(45) Date of Patent: May 8, 2018

(54) REDUCED-VIBRATION STEPPER MOTOR

(71) Applicant: Lin Engineering, Morgan Hill, CA (US)

(72) Inventors: Ted T. Lin, Saratoga, CA (US); Harlan H. Nguyen, San Jose, CA (US)

(73) Assignee: LIN ENGINEERING, INC., Morgan Hill, CA (US)

( * ) Notice: Subject to any disclaimer, the term of this patent is extended or adjusted under 35 U.S.C. 154(b) by 350 days.

(21) Appl. No.: 14/950,269

(22) Filed: Nov. 24, 2015

(65) Prior Publication Data

US 2017/0149322 A1 May 25, 2017

(51) Int. Cl.
*G04C 13/11* (2006.01)
*H02K 37/22* (2006.01)

(52) U.S. Cl.
CPC .................... *H02K 37/22* (2013.01)

(58) Field of Classification Search
CPC ...................................... H02K 37/22
USPC ...................................... 310/49.01
See application file for complete search history.

(56) References Cited

U.S. PATENT DOCUMENTS

| | | | |
|---|---|---|---|
| 4,471,248 A | 9/1984 | Smetana | |
| 4,590,814 A | 5/1986 | Wadensten | |
| 4,617,484 A | 10/1986 | Buijsen | |
| 5,235,227 A | 8/1993 | Fazekas | |
| 5,402,024 A | 3/1995 | Watanabe et al. | |
| 6,209,692 B1 | 4/2001 | Pels et al. | |
| 7,357,229 B2 | 4/2008 | Kondo et al. | |
| 7,659,645 B2 | 2/2010 | Bi | |
| 7,709,991 B2 | 5/2010 | Ionel et al. | |
| 7,737,583 B2 | 6/2010 | Bi | |
| 8,791,609 B2 | 7/2014 | Koehn et al. | |
| 9,093,869 B2 | 7/2015 | Reeves et al. | |
| 9,140,297 B2 | 9/2015 | Hashish et al. | |
| 2010/0215475 A1* | 8/2010 | Brewster | F04D 17/168 415/90 |
| 2013/0216351 A1 | 8/2013 | Griffin | |

(Continued)

OTHER PUBLICATIONS

Printout: Unimer, "Vibration Damper—Type 1", 12 pages.
Printout: Polymax Ltd., "Polymax AV Mounts—A Type", 38 pages.

*Primary Examiner* — Jianchun Qin
(74) *Attorney, Agent, or Firm* — Thomas Schneck

(57) ABSTRACT

A stepper motor has a stator winding assembly with a permanent ring magnet located radially outside of electromagnetic windings for the stator poles. The permanent ring magnet remotely magnetizes a rotor seated by bearings on an axial shaft so as to rotate within the stator winding assembly, thereby freeing up space within the rotor for an internal damper. The rotor has a cylindrical damping weight enclosed within, but not fixed to, the rotor. The weight ideally has a rotational moment of inertia that substantially matches that of the rotor. The weight is elastically coupled to the rotor by a viscous material contained in the rotor and filling the space between the weight and the rotor and between the weight and the axial shaft. The viscosity of this material is selected such that motion of the weight is delayed, preferably so as to be substantially 180° out-of-phase with, but at the same frequency as, the stepping rotation of the rotor. The weight thereby serves as a counterweight to the rotor so as to cancel vibrations generated by stepping of the rotor.

4 Claims, 5 Drawing Sheets

(56) References Cited

U.S. PATENT DOCUMENTS

2014/0333159 A1* 11/2014 Lin ..................... H02K 37/10
310/48

* cited by examiner

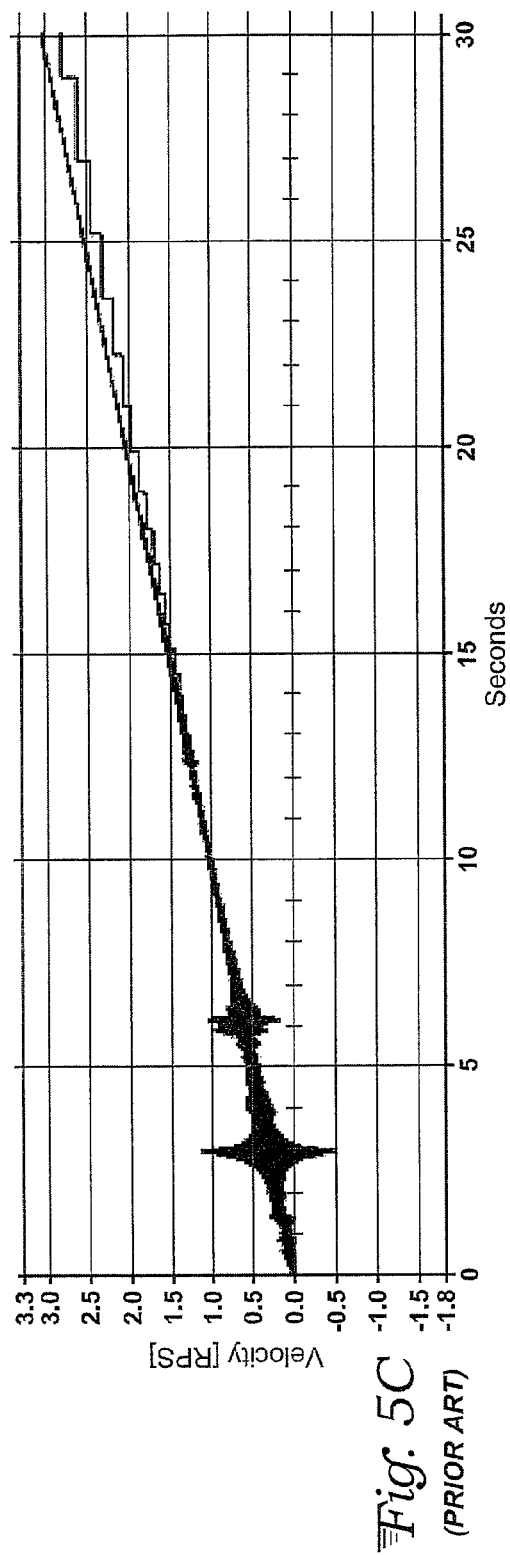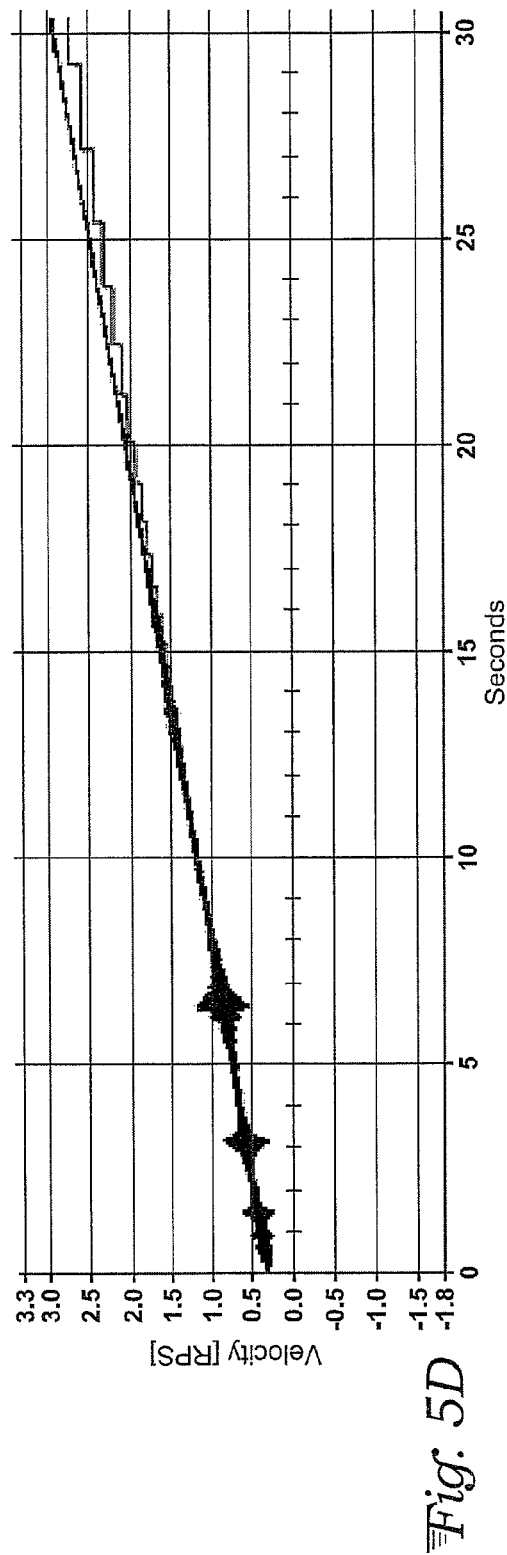
Fig. 5C (PRIOR ART)
Fig. 5D

REDUCED-VIBRATION STEPPER MOTOR

TECHNICAL FIELD

The present invention relates to electric motors, such as stepper motors, having anti-vibration features.

BACKGROUND ART

Stepper motors tend to be particularly prone to vibration and noise because of their inherent stepping motion from one detent position to the next. There have been many designs introduced in the motor industry to reduce motor vibration. For instance, varying the stator pitch angles is the most common way to reduce detent torque, and thus reduce noise and vibration. However, the magnetic coupling between the stator and the rotor creates a nature of vibration that is almost impossible to be eliminated.

For this reason, a mechanical damper has frequently been attached externally to the motor's axial drive shaft in many step motor applications to smooth or isolate any vibration from the load being driven. Such dampers are typically constructed of rubber or other bulk elastomeric material, often in the form of a cylindrical bobbin. It is a very effective way to damp the vibration to obtain smooth motion of the motor's axial drive shaft. The drawback of an external damper is an additional rotating part exposed outside of the motor.

Then, an internal damper was introduced to avoid the rotating part exposed outside of the motor, but this added a requirement for extra space inside the motor, increasing overall motor size. One form of such internal damper couples the rotor to the axial drive shaft through radial spokes or ribs of elastic material for resilient, torsionally flexible action intended to smooth the shaft's rotation as it is driven by the stepping of the rotor. Other internal dampers connect an outer rotor portion to an inner rotor portion with rubber rings or sleeves. The magnetically-active outer portion interacts with the stator to produce stepping motion, while the inner portion is directly coupled to the drive shaft.

Magnetically-coupled dampers, such as those based on Lenz' law and eddy currents are also available, as for example the dampers described in U.S. Pat. No. 9,140,297 to Hashish et al. and U.S. Patent Application Publication 2013/0216351 of Griffin.

US Patent Application Publication 2014/0333159 of Ted Lin (incorporated by reference herein) describes a hybrid stepper motor that locates a permanent ring magnet in the stator assembly radially outside of the stator coils. The magnet flux from this ring magnet remotely magnetizes the rotor, which is positioned radially inside of the stator, mounted to an axial drive shaft.

SUMMARY DISCLOSURE

A stepper motor is provided which has a vibration damper or isolator in relation to the rotor and its connection to the axial drive shaft, and in particular a mechanical damper incorporated within the rotor itself. This is made possible because the permanent magnet for magnetizing the rotor is located in the stator assembly structure, such that the rotor is magnetized remotely, the leaving the interior of the rotor able to incorporate a damper internally without increasing its size. The damper may be a viscous damper, wherein a dummy weight, situated together with viscous material within the rotor's housing, oscillates out-of-phase with respect to the rotor.

BRIEF DESCRIPTION OF THE DRAWINGS

FIGS. 5A through 5D are graphs of rotational velocity versus time for two prior step motors (FIGS. 5A and 5B) in operation and corresponding counterpart step motor embodiments that include dampers, wherein FIG. 5D represents an embodiment with an internal damper according to the present invention.

DETAILED DESCRIPTION

Figure 1:
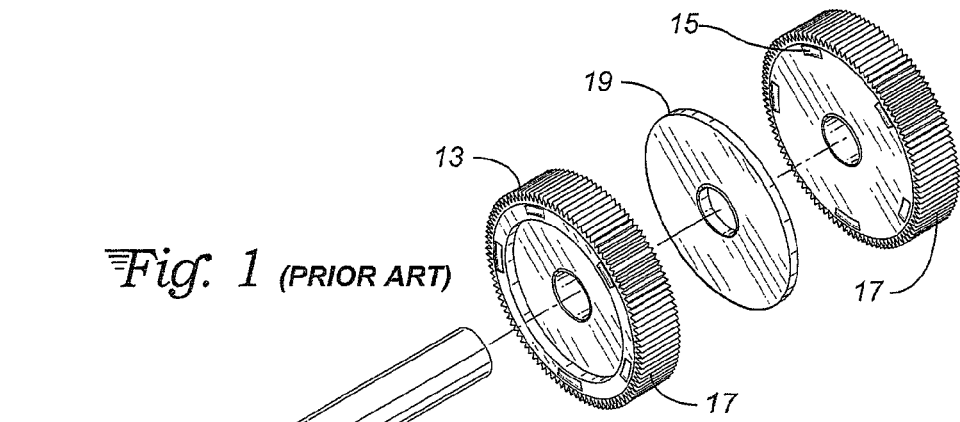
FIG. 1 shows a conventional rotor assembly of the prior art with a disc magnet sandwiched by two rotor sections.
Figure 5A:
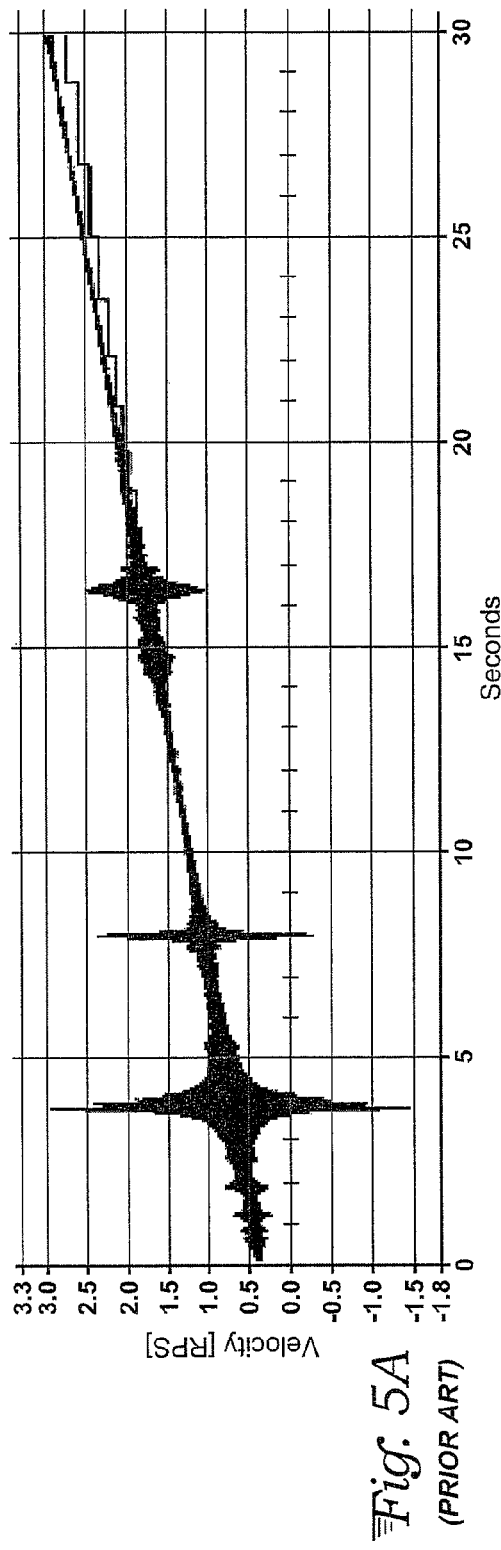

With reference to FIG. 1, a conventional rotor assembly of the prior art includes an axial shaft 11 onto which is attached two rotor sections 13 and 15. Each rotor section 13 and 15 has a plurality of rotor teeth 17 that interact magnetically with corresponding stator teeth located on a set of electromagnetic poles of a stator (not shown). Typically, the rotor teeth 17 of one rotor section 13 are offset by one-half rotor tooth pitch relative to the rotor teeth 17 of the other rotor section 15. In this embodiment, a permanent ring magnet 19 is sandwiched between the two rotor sections 13 and 15 with the north-south (N-S) magnetic direction parallel to the axis of shaft 11. The magnet 19 directly magnetizes the rotor sections 13 and 15, so that the teeth on one section 13 have N polarity while the teeth on the other section 15 have S polarity. As seen in FIG. 5A, the rotational velocity over time shows relatively large vibrations for this embodiment. FIG. 5C shows rotational velocity using the same motor, but with an external damper attached. The external damper removes some of the vibrational noise.

Figure 2:
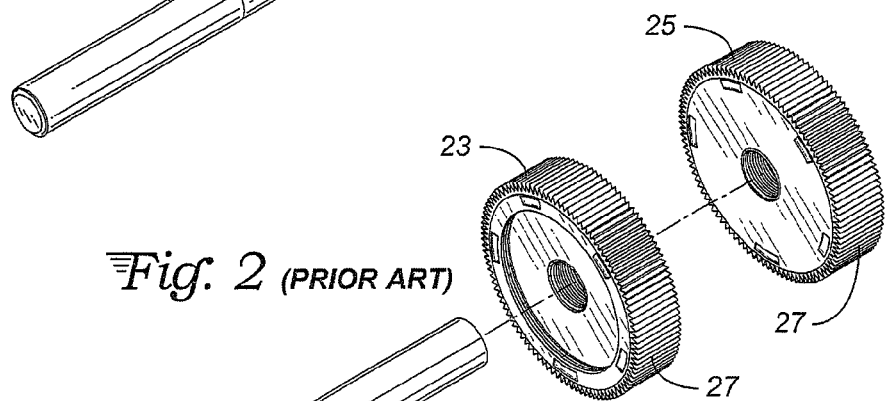
FIG. 2 shows the rotor assembly U.S. patent application publication 2014/0333159.
Figure 5B:
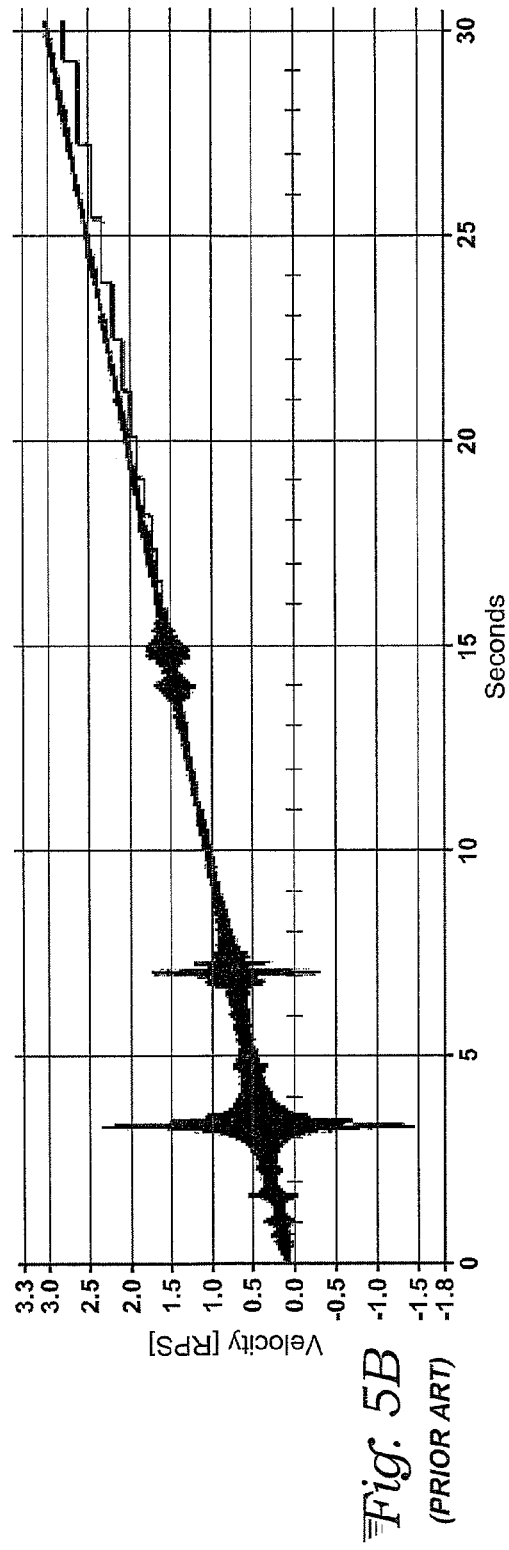

With reference to FIG. 2, a rotor assembly like that described in U.S. patent application publication 2014/0333159 likewise has an axial shaft 21 onto which are attached two rotor sections 23 and 25, each having a plurality of rotor teeth 27. The rotor teeth 27 on the sections 23 and 25 may be arranged in a one-half pitch offset manner similar to that in FIG. 1. However, in this embodiment, there is no permanent magnet between the two rotor sections. As described in the published patent application (e.g. for FIG. 2A of that document), a permanent ring magnet is instead provided radially outside of the stator coils sandwiched between outer portions of the stator winding assembly. In that case, the rotor is magnetized remotely by the magnetic flux that passes axially through the ring interior of that magnet. As a result, the magnetic interaction occurring in the gap between the respective rotor and stator teeth is dominated by the flux generated by Ampere-turns of energized stator coils, with reduced flux interactions from non-energized poles. As seen in FIG. 5B, and by comparison with FIG. 5C, the rotational velocity over time shows some reduction in vibration for this embodiment compared to that for FIG. 1.

Neither embodiment of FIG. 1 or 2 includes any vibration damper internal to the motor. Any damper that might be included with this motor would be an external damper attached to the axial shaft and isolating motor vibrations from a driven shaft of the load. Such a damper might be a cylindrical bobbin of bulk elastomeric material connecting the motor's axial shaft to the driven shaft of the load. While that is an effective way to isolate the motor vibration from the load, it does nothing to reduce the motor vibration itself.

Figure 3:
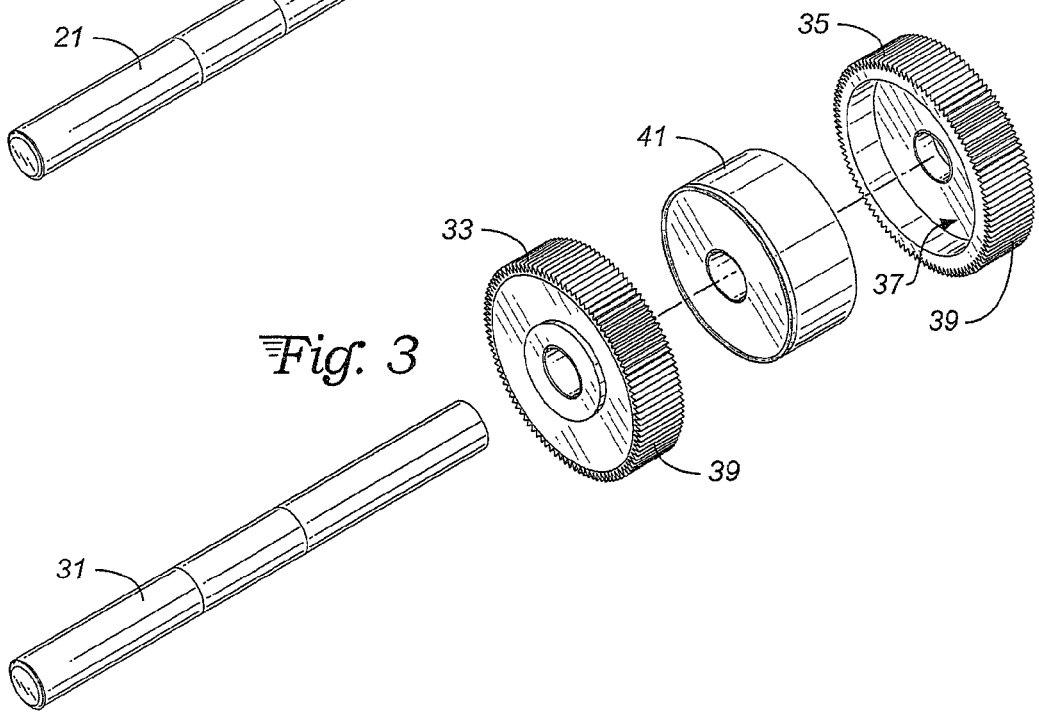
FIG. 3 shows a perspective view of the new invention of the rotor assembly, with a brass circular cylinder sandwiched by two rotor sections.
Figure 4:
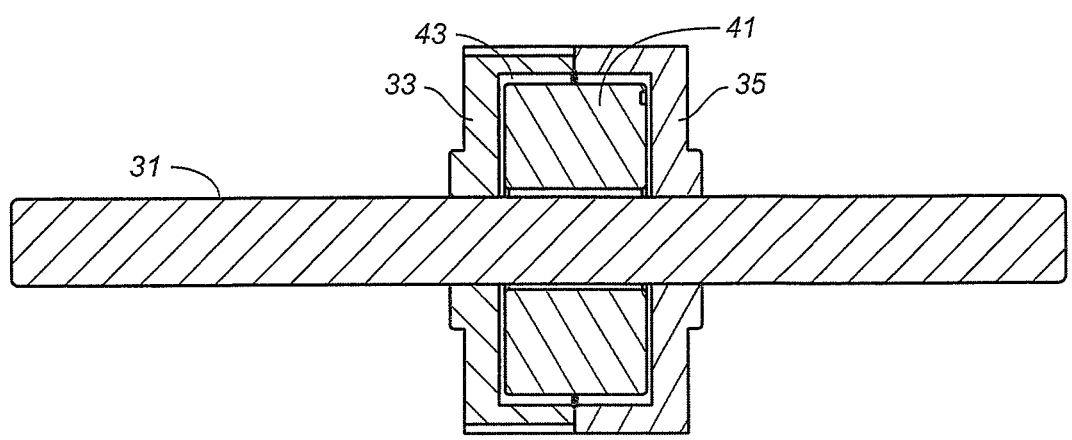
FIG. 4 shows a sectional view of the new invention of FIG. 3, with the brass cylinder coupled with the rotor sections by a viscous silicone gel.

With reference to FIGS. 3 and 4, an improved rotor having an internal damper in accord with the present invention is seen. An axial shaft 31 has two rotor sections 33 and 35 attached thereto. The rotor sections both have a shell-like construction with hollow interiors 37 and cylindrical exteriors with teeth 39. A weight 41 is enclosed within the rotor sections 33 and 35. The weight 41, which may be a solid cylindrical body with a central (i.e. axial) hole, is neither attached to the axial shaft 31 nor to the rotor sections 33 and 35, but can rotate freely around the shaft 31, that is until remaining space in the rotor interior 37 is filled with viscous material 43. The viscous material 43 serves to weakly (i.e. not fixedly) couple the weight 41 to the shaft 31 and rotor sections 33 and 35. The weight 41 is still able to move relative to both shaft and rotor sections, but with resistance supplied by the viscosity of the material 43.

The damping fluid may be composed, for example, of a medium or high viscosity, polydimethylsiloxane material or other silicone oil or gel having anywhere from 100 to 100,000 centipoise dynamic viscosity (approx. 1000 centipoise is typical). The viscosity is selected to provide the proper damping character. In particular, if the viscosity is too low, the damping weight 41 will be insufficiently coupled to the rotor for effective damping. If the viscosity is too high, the damper's motion will not be properly delayed relative to the rotor's motion so as to cancel out the vibration. This could be determined with calculations using mechanical damping equations, but more easily by experimenting with viscous fluids over a range of different viscosities in order to find that one which minimizes vibration. Or, the calculations can be used to narrow the trial range of viscosities for a given motor design. It should be noted that when a silicone oil or gel is used, it may polymerize over time, but the resulting silicone rubber will still have elastic properties and continue to effectively damp vibrations.

Figure 6:
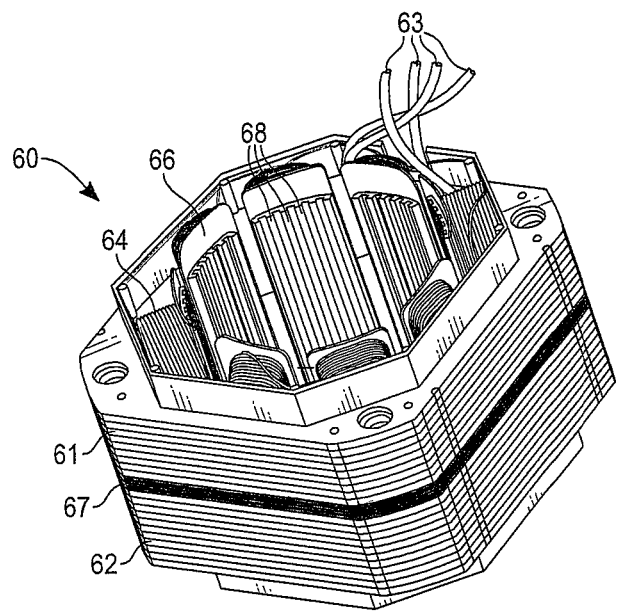
FIG. 6 is a perspective view of a stator winding assembly with permanent magnet for use with the rotor assembly with internal damper of FIG. 4 in accord with the present invention.
Figure 7:
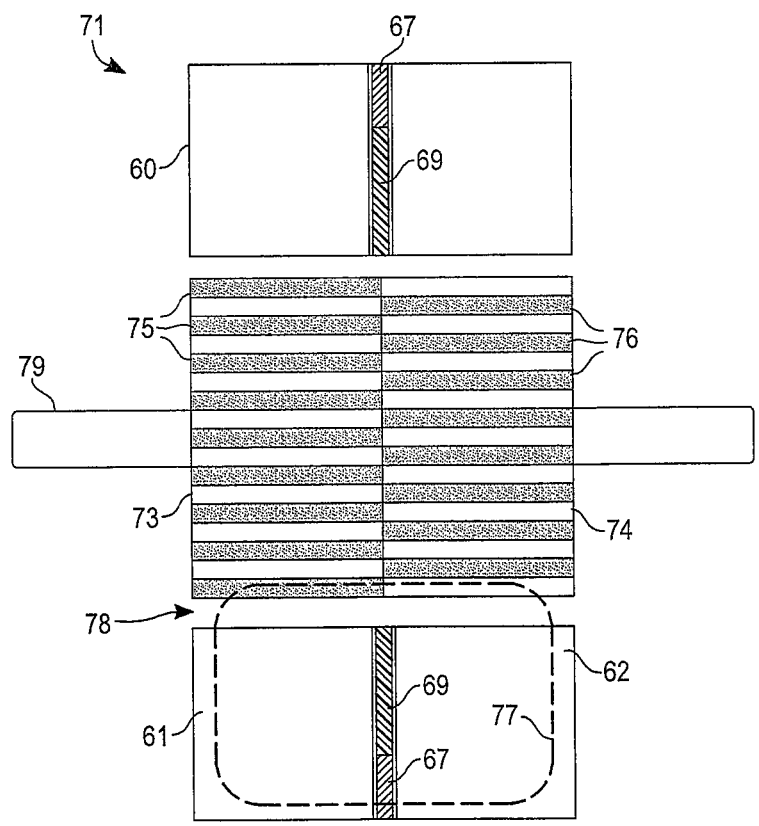
FIG. 7 is a hybrid view combining a side plan view of rotor assembly with internal damper, as in FIG. 4, and a sectional view of a stator assembly with permanent magnet, as in FIG. 6.

As in FIG. 2, a motor using the rotor assembly shown in FIGS. 3 and 4 will also have a stator winding assembly 60, illustrated by way of example in FIGS. 6 and 7, including a stator 61, 62 with a set of stator poles 66 wound with coils 64 that can be driven in a series of phases via wires 63 coupled to a driver (not shown) so as to magnetically interact with the rotor. The stator poles 66 have sets of stator teeth 68 (usually between three and six stator teeth per pole, depending on motor size). The stator teeth 68 on a given stator pole 66 are selectively magnetized by energizing the stator coils 64 for that pole, according to the particular drive phase of the motor 71. Also as in FIG. 2, and like the motor in US Patent Application Publication No. 2014/0333159, the stator has a permanent ring magnet 67 located radially outside of the coils 64 and sandwiched between outer portions of two stator stack elements 61 and 62. The permanent ring magnet 67 in the stator 60 produces a magnetic flux 77 passing axially through the ring interior to remotely magnetize the rotor (sections 73 and 74) along with its rotor teeth 75 and 76. Thus, with the rotor assembly of FIGS. 3 and 4 fitting within such a stator winding assembly and seating the axial shaft 79 on bearings so as to rotate within the stator winding assembly as the stator coils 66 are selectively energized in a sequence according to the motor drive phase, the magnetic flux in the air gap 78 between respective rotor teeth 75 and 76 and stator teeth 68 is dominated (because of the remoteness of the permanent magnet 67) by flux generated from the Ampere-turns of the energized stator coils 64, with reduced flux interactions from non-energized coils.

As the stator windings 64 are selectively energized in a sequence according to the motor drive phase, the rotor teeth 75 and 76 interact magnetically with the stator teeth 68 on those stator poles 66 that are energized, so that the rotor steps through a sequence of detent positions defined by the magnetic interaction. As the rotor steps from one detent position to the next, vibrations are generated. However, with the internal damper (again see FIG. 4) supplied by the damping weight 41 and viscous fluid 43, the vibrations will be damped, i.e. reduced. In particular, the damping weight 41, which preferably has a rotational moment of inertia that substantially matches the combined moment of inertia of the axial shaft 31 and attached rotor sections 33 and 35 for maximum damping effect, serves as a counterweight with a delayed rotational step motion. The delay is supplied by the viscosity of the material 43. If the viscosity is properly selected, the delay will cause the damping weight 41 to step substantially 180° out-of-phase in relation to the stepping of the rotor sections. However, it should be recognized that even if the viscosity is somewhat higher or lower than an ideal viscosity so that the delay in motion of the weight 41 is not quite out-of-phase with the rotor, or if the damping weight's moment of inertia doesn't quite match that of the rotor, there will be considerable damping compared to no counterweight at all. FIG. 5D shows an example of substantial damping of vibration from a motor having the internal damper in accord with the present invention.

What is claimed is:

1. A reduced-vibration step motor, comprising:
   a stator winding assembly including a stator with a set of stator poles wound with coils that can be driven in a series of phases so as to magnetically interact with a rotor, the stator poles having sets of stator teeth that are selectively magnetized by energizing of the stator coils, the stator also having a permanent ring magnet located radially outside of the coils and sandwiched between outer portions of two stator stack elements of the stator; and
   a rotor with a plurality of rotor teeth, the rotor fitting within the stator winding assembly and seated by bearings on an axial shaft so as to rotate within the stator winding assembly, the permanent ring magnet in the stator producing magnetic flux passing axially through a ring interior to remotely magnetize the rotor and its rotor teeth, such that magnetic flux in an air gap between rotor and stator teeth is dominated by the flux generated by Ampere-turns of energized stator coils with reduced flux interactions from non-energized poles,
   the rotor being characterized by having a viscous mechanical damper internal thereto, wherein the viscous mechanical damper comprises a weight enclosed within, but not fixed to, the rotor and mechanically coupled thereto by a viscous material such that motion of the weight is substantially out-of-phase with, but at the same frequency as, the stepping rotation of the rotor.

2. A motor as in claim 1, wherein the weight comprises a cylindrical body having a rotational moment of inertia that substantially matches that of the rotor.

3. A motor as in claim 1, wherein the viscous material is contained within the rotor and fills space between the weight and the rotor and between the weight and the axial shaft, the viscous material providing an elastic coupling of the weight to the rotor with a damping character having been selected to obtain the substantially out-of-phase motion of the weight to cancel vibrations of the rotor.

4. A reduced-vibration step motor, comprising:
a stator winding assembly including a stator with a set of stator poles wound with coils that can be driven in a series of phases so as to magnetically interact with a rotor, the stator poles having sets of stator teeth that are selectively magnetized by energizing of the stator coils, the stator also having a permanent ring magnet located radially outside of the coils and sandwiched between outer portions of two stator stack elements of the stator; and
a rotor with a plurality of rotor teeth, the rotor fitting within the stator winding assembly and seated by bearings on an axial shaft so as to rotate within the stator winding assembly, the permanent ring magnet in the stator producing magnetic flux passing axially through a ring interior to remotely magnetize the rotor and its rotor teeth, such that magnetic flux in an air gap between rotor and stator teeth is dominated by the flux generated by Ampere-turns of energized stator coils with reduced flux interactions from non-energized poles, the rotor being characterized by having a cylindrical weight enclosed within, but not fixed to, the rotor, the weight having a rotational moment of inertia that substantially matches that of the rotor, the weight further being elastically coupled to the rotor by a viscous material contained in the rotor and filling the space between the weight and the rotor and between the weight and the axial shaft, the viscous material having a viscosity selected such that motion of the weight is substantially out-of-phase with, but at the same frequency as, the stepping rotation of the rotor so as to cancel vibrations of the rotor.

* * * * *